United States Patent

[11] 3,590,136

| [72] | Inventors | Takeshi Kunishi<br>Kariya-shi;<br>Yoshihiro Kawade, Kariya-shi; Koiti<br>Yamakita, Ama-gun, Aichi-ken; Ryozo<br>Takani, Hekikai-gun, Aichi-ken; Katuhiro<br>Yamanaka, Hekinan-shi, all of, Japan |
|---|---|---|
| [21] | Appl. No. | 881,373 |
| [22] | Filed | Dec. 2, 1969 |
| [45] | Patented | June 29, 1971 |
| [73] | Assignee | Nippondenso Kabushiki Kaisha<br>Kariya-shi, Aichi-ken, Japan |
| [32] | Priority | Dec. 17, 1968 |
| [33] | | Japan |
| [31] | | 92904 |

[54] HOUSING FOR ENCLOSING INSTRUMENTS AND THE LIKE TO BE MOUNTED ON INSTRUMENT PANEL OF AUTOMOBILE
6 Claims, 4 Drawing Figs.

[52] U.S. Cl............................................................ 174/50,
317/101, 180/90
[51] Int. Cl............................................................ H05k 5/00
[50] Field of Search............................................. 174/52,
52.6, 52.5, 50, 59; 317/101, 99; 296/70; 180/90

[56] References Cited
UNITED STATES PATENTS

| 2,829,426 | 4/1958 | Franklin................ | 317/99 X |
| 2,963,577 | 12/1960 | Errichiello et al........... | 317/101 R |
| 3,046,452 | 7/1962 | Gellert.......................... | 174/52 (.6) |
| 3,155,766 | 11/1964 | Eichert et al.................. | 174/52 (.6) |
| 3,174,576 | 3/1965 | Woofter et al................ | 174/72 (A) |

Primary Examiner—Lewis H. Myers
Assistant Examiner—D. A. Tone
Attorney—Cushman, Darby & Cushman ABSTRACT: A housing for enclosing instruments such as meters, a radio, gages, control units for an air-conditioning system, etc. and the like to be mounted on a front instrument panel of an automobile, in the partitioned chambers molded together with said housing made of a synthetic resin. The housing is provided with electric conductors embedded therein for electrical connections of said instruments and the like with their corresponding exterior instruments, machines and the like.

PATENTED JUN29 1971 3,590,136
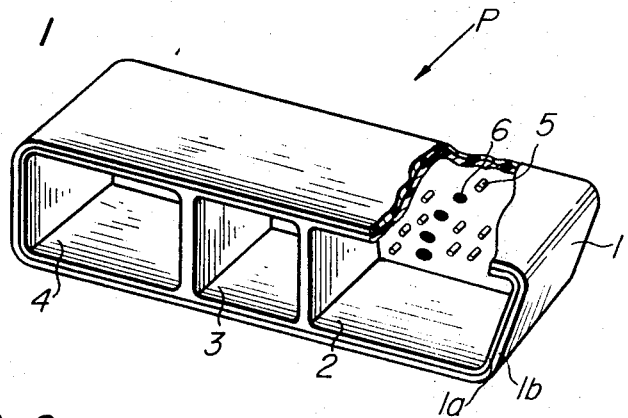
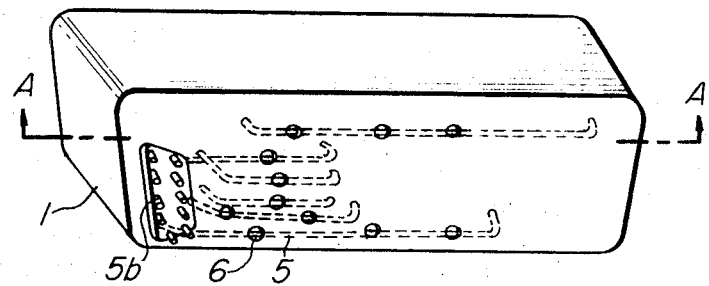
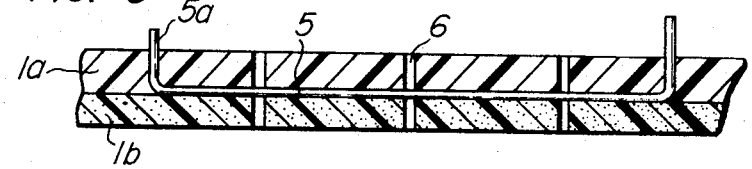
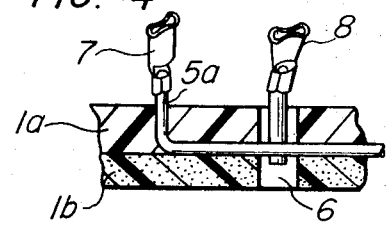
INVENTORS
Takeshi Kunishi
Yoshihiro Kawada
Koiti Yamakita
Ryozo Takaki
Katuhiro Yamanaka
BY Cushman, Darby & Cushman
ATTORNEYS

HOUSING FOR ENCLOSING INSTRUMENTS AND THE LIKE TO BE MOUNTED ON INSTRUMENT PANEL OF AUTOMOBILE

BACKGROUND OF THE INVENTION

The present invention relates to an instrument panel of an automobile and more particularly a housing for enclosing therein instruments such as meters, gages, a radio, control units for an air-conditioning system, etc., and the like which are mounted on an instrument panel of an automobile, in the partitioned chambers defined in said housing and making the electrical connections among said instruments and the like and with the exterior.

On an instrument panel of an automobile are mounted various equipments for the safe operation of the automobile and for improving the maneuverability of the automobile and increasing the comforts and pleasure of driving such as speed meter, fuel gage, a radio, control units for an air-conditioning system, and the like. Generally these instruments and the like are electrically connected with each other and with the equipments and the like exterior of the instrument panel by use of lead wires or printed circuit boards. However, in case of the electrical connections by use of the lead wires, a relatively larger space is required; the lead wires are entangled, thus causing misconnections; and they tend to be disconnected. In case of the printed circuit boards, they are very expensive because of the special production methods thereof and furthermore they are limited to the platelike form, thus resulting in the limited wiring design.

The conventional front instrument panel of an automobile generally consists of a housing or compartment for enclosing the instruments, another housing for enclosing the radio, the control units for the air-conditioning system, etc. and a glove box. Generally these housings and box are fabricated independently and thereafter assembled into a unitary construction so that a number of fabrication and assembly steps is inevitably increased.

SUMMARY OF THE INVENTION

Accordingly, one of the objects of the present invention is to provide a housing for enclosing the instruments and the like described above in the partitioned chambers integrally formed with the housing in the form of a box made of a synthetic resin, thereby reducing the number of fabrication steps and eliminating the assembly steps which are required in the conventional instrument panel as described above.

Another object of the present invention is to provide a housing of the character described above having electric conductors embedded therein for electrical connections among the instruments and the like and between them and their corresponding instruments, machines, equipments and the like exterior of the instrument panel, thereby facilitating the electrical wiring works and eliminating disconnections and misconnections. It must be noted that the above embedded conductors also advantageously serve as the reinforcing members of the box-shaped housing of the present invention.

A further object of the present invention is to provide a housing of the type described above which is simple in construction, fabrication and assembly into the body of the automobile and inexpensive to manufacture.

In brief, a housing for enclosing instruments a radio, control units for an air-conditioning system, etc. and the like according to the present invention comprises a box made of a synthetic resin and having a plurality of partitioned chambers formed integral with said box, said chambers being adapted to enclose therein said instruments, control units and the like to be mounted on the instrument panel of an automobile, and electric conductors embedded in the walls of said partitioned chambers which enclose the instruments, control units and the like requiring the electrical connections among them and with the exterior instruments, machines, equipments and the like.

The above and other objects, features and advantages of the present invention will become more apparent from the following description of one illustrative embodiment thereof with reference to the accompanying drawing.

BRIEF DESCRIPTION OF THE DRAWINGS

FIG. 1 is a perspective front view of a housing in accordance with the present invention;

FIG. 2 is a rear view viewed in the direction indicated by the arrow P in FIG. 1;

FIG. 3 is a sectional view taken along the line A-A of FIG. 2, illustrating especially the arrangement of embedded electric conductors; and FIG. 4 is a fragmentary sectional view illustrating the connection of the embedded conductor and the terminals of a meter or the like enclosed in the housing.

DESCRIPTION OF THE PREFERRED EMBODIMENT

Reference numeral 1 designates a main body in the form of a box having a chamber 2 for housing instruments such as a speed meter, a fuel gage, a tachometer, etc.; a chamber 3 for housing a radio, control units for an air-conditioning system, etc.; and a glove box 4. The main body 1 comprises an inner layer 1a made of a thermoplastic or thermosetting resin suitable as a structural member such as ABS resin, polyacetal, phenolic resin, epoxy resin, etc. and an outer layer 1b made of a foamed resin such as foamed vinyl chloride resin, styrole, both of the inner and outer layers 1a and 1b being injection-molded as one unitary construction or assembly. As best shown in FIG. 3, in the chambers where the electrical wiring is required, especially in the chambers 2 and 3, conductors 5 for wiring are embedded in the vicinity of the boundary between the inner and outer layers 1a and 1b and may be bare or insulated wires in the form of a round, square or flat wire depending upon the purpose.

The conductors 5 embedded may be used for establishing arbitrary circuits and are provided with insertion holes 6 as best shown in FIG. 3. As shown in FIG. 4, the electrical connections among the instruments and control units housed within the main body 1 may be made simply by connecting directly a terminal 7 of the instrument or the control unit to the outwardly projected end portion 5a of the conductor 5 or inserting a terminal 8 into the hole 6 so as to connect it electrically to the conductor 5. As shown in FIG. 2, at the back surface of the main body 1 is attached a terminal board or panel having a plurality of terminals for connection of the conductors 5 with the machines, instruments and the like mounted outside of the main body 1 so as to facilitate the electrical connection.

In the instant embodiment, the wall of the main body 1 has been described as being comprised of the inner and outer layers 1a and 1b so as to enable it to absorb the impact exerted thereto. However, it will be understood that the main body may be made of a single resin suited as a structural member with the conductor 5 being embedded therein. Furthermore, the chambers partitioned in the main body 1 are not limited to three and any suitable number of chambers may be provided as needs demand.

The present invention has been so far described with particular reference to the one illustrative embodiment thereof, but it will be understood that variations and modifications can be effected without departing the true spirit of the present invention as described hereinabove and as defined in the appended claims.

We claim:

1. A housing for enclosing instruments such as meters, a radio, control units for an air-conditioning system and the like to be mounted on a front instrument panel of an automobile, comprising a box made of a synthetic resin and provided with a plurality of chambers partitioned by partition walls integrally molded with said box for enclosing therein instruments, such as meters, the radio, control units for the air-conditioning system and the like to be mounted on the instrument panel of the automobile, and a plurality of electric conductors embedded in the walls of said box where electrical connection is required.

2. A housing as set forth in claim 1 wherein the outer wall of said box comprises an inner and outer layers each made of synthetic resins, and said conductors are embedded between said inner and outer layers.

3. A housing as set forth in claim 1 wherein means for electrically connecting said instruments and the like are provided at the inner surfaces of said box.

4. A housing for enclosing instruments of an automobile instrument panel comprising:

an outer box made of a synthetic resin, said outer box having an open side and a plurality of sidewalls;

at least one partition wall integrally molded with said box for providing a plurality of chambers within said box separated from one another by said at least one partition wall; at least one of said chambers being open at said open side of said outer box for receiving said instruments; and electrical conductors embedded in at least one of said walls where electrical connection is required for said instruments;

said sidewalls each comprising an inner and an outer layer each made of synthetic resin, and said electrical conductors being embedded between said inner and outer layers of said at least one wall.

5. A housing as in claim 4, wherein said at least one wall having said electrical conductors embedded is further provided with through-holes for electrical connection between said instruments and said conductors.

6. A housing as in claim 5 wherein said at least one wall having said conductors embedded therein further includes on said inner layer side means connected to said conductors for electrically connecting said conductors and said instruments.

UNITED STATES PATENT OFFICE
CERTIFICATE OF CORRECTION

Patent No. 3,590,136          Dated June 29, 1971

Inventor(s) Takeshi Kunishi et al

It is certified that error appears in the above-identified patent and that said Letters Patent are hereby corrected as shown below:

Page 1, under heading "Inventors", line 5, read --Takaki, Hekikai-gun, Aichi-ken; Katuhiro--.

Signed and sealed this 11th day of January 1972.

(SEAL)
Attest:

EDWARD M. FLETCHER, JR.      ROBERT GOTTSCHALK
Attesting Officer               Acting Commissioner of Patents